(12) United States Patent
Vacek

(10) Patent No.: US 10,699,585 B2
(45) Date of Patent: Jun. 30, 2020

(54) UNMANNED AERIAL SYSTEM DETECTION AND MITIGATION

(71) Applicant: University of North Dakota, Grand Forks, ND (US)

(72) Inventor: Joseph James Vacek, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 105 days.

(21) Appl. No.: 16/053,076

(22) Filed: Aug. 2, 2018

(65) Prior Publication Data

US 2020/0043346 A1 Feb. 6, 2020

(51) Int. Cl.
*G08G 5/00* (2006.01)
*B64C 39/02* (2006.01)
*G05D 1/00* (2006.01)
*F41H 11/02* (2006.01)

(52) U.S. Cl.
CPC ........... *G08G 5/006* (2013.01); *B64C 39/024* (2013.01); *F41H 11/02* (2013.01); *G05D 1/0022* (2013.01); *G08G 5/0082* (2013.01); *B64C 2201/146* (2013.01)

(58) Field of Classification Search
CPC .... G08G 5/006; G08G 5/0008; G08G 5/0082; B64C 39/24; G05D 1/0022
USPC .......................................................... 701/2
See application file for complete search history.

(56) References Cited

U.S. PATENT DOCUMENTS

| 10,049,202 | B1* | 8/2018 | Johansson | G06F 21/36 |
| 10,249,199 | B2* | 4/2019 | Banga | B64C 39/024 |
| 2017/0094527 | A1 | 3/2017 | Shattil et al. | |
| 2017/0150308 | A1* | 5/2017 | Jones | H04W 4/021 |
| 2018/0197420 | A1* | 7/2018 | Banga | B64C 39/024 |
| 2018/0225977 | A1* | 8/2018 | Ichihara | B64C 39/024 |

FOREIGN PATENT DOCUMENTS

| CN | 107016690 A | 8/2017 |
| CN | 107132583 A | 9/2017 |
| CN | 107800506 A | 3/2018 |

* cited by examiner

*Primary Examiner* — Albert K Wong
(74) *Attorney, Agent, or Firm* — Schwegman Lundberg & Woessner, P.A.

(57) ABSTRACT

The present subject matter provides various technical solutions to technical problems facing UAV detection and mitigation. Information received from UAV detection sensors may be analyzed or matched against known UAV characteristics. The analysis or matching may be used to identify the UAV, analyze the UAV characteristics or navigational behavior, and classify the UAV behavior and the UAV itself. The UAV may be classified as either compliant, ignorant (e.g., unintentional) and noncompliant, or purposeful (e.g., intentional) and noncompliant. The UAV classification may be improved by using UAV characteristic analysis performed by an artificial neural network (ANN) algorithm using specific UAV classifiers. A UAV mitigation command or mitigation response may be generated based on the UAV characteristic analysis combined with a UAV safety risk assessment. The mitigation command may cause nondestructive interference, destruction, capture, or another UAV mitigation response.

20 Claims, 7 Drawing Sheets

UNMANNED AERIAL SYSTEM DETECTION AND MITIGATION

TECHNICAL FIELD

Embodiments described herein generally relate to unmanned aerial vehicle detection.

BACKGROUND

An unmanned aerial system (UAS) may include an unmanned aerial vehicle (UAV, e.g., a drone) and a UAV control device, where a UAV operator (e.g. pilot) uses the control device to operate the UAV. UAVs provide various advantages over manned aerial vehicles, such as reduced initial and operational cost, improved maneuverability, improved operator safety, and other advantages. These improvements have significantly reduced the barriers to ownership and operation of UAVs, resulting in a significant increase in the number of UAVs operated by the public.

The increased number of UAVs has driven an increased need for regulation of UAV operations. These regulations may be mandated by the U.S. Federal Aviation Administration (FAA), by other national and international aviation regulations, by state law, by local municipalities, or by other organizations. These regulations may include a maximum flight altitude, a maximum operator distance, minimum safe distances from designated areas (e.g., airports, private property), mandatory UAV registration, and other regulations. However, there are several barriers to enforcing these regulations, including the difficulties in detecting and identifying a UAV or UAV operator. Additionally, mitigating a threat posed by an intruding UAV often relies on a human (e.g., security, law enforcement) to repel or capture the intruding UAV. What is needed is an improved UAV detection and mitigation solutions.

DESCRIPTION OF EMBODIMENTS

Figure 1:
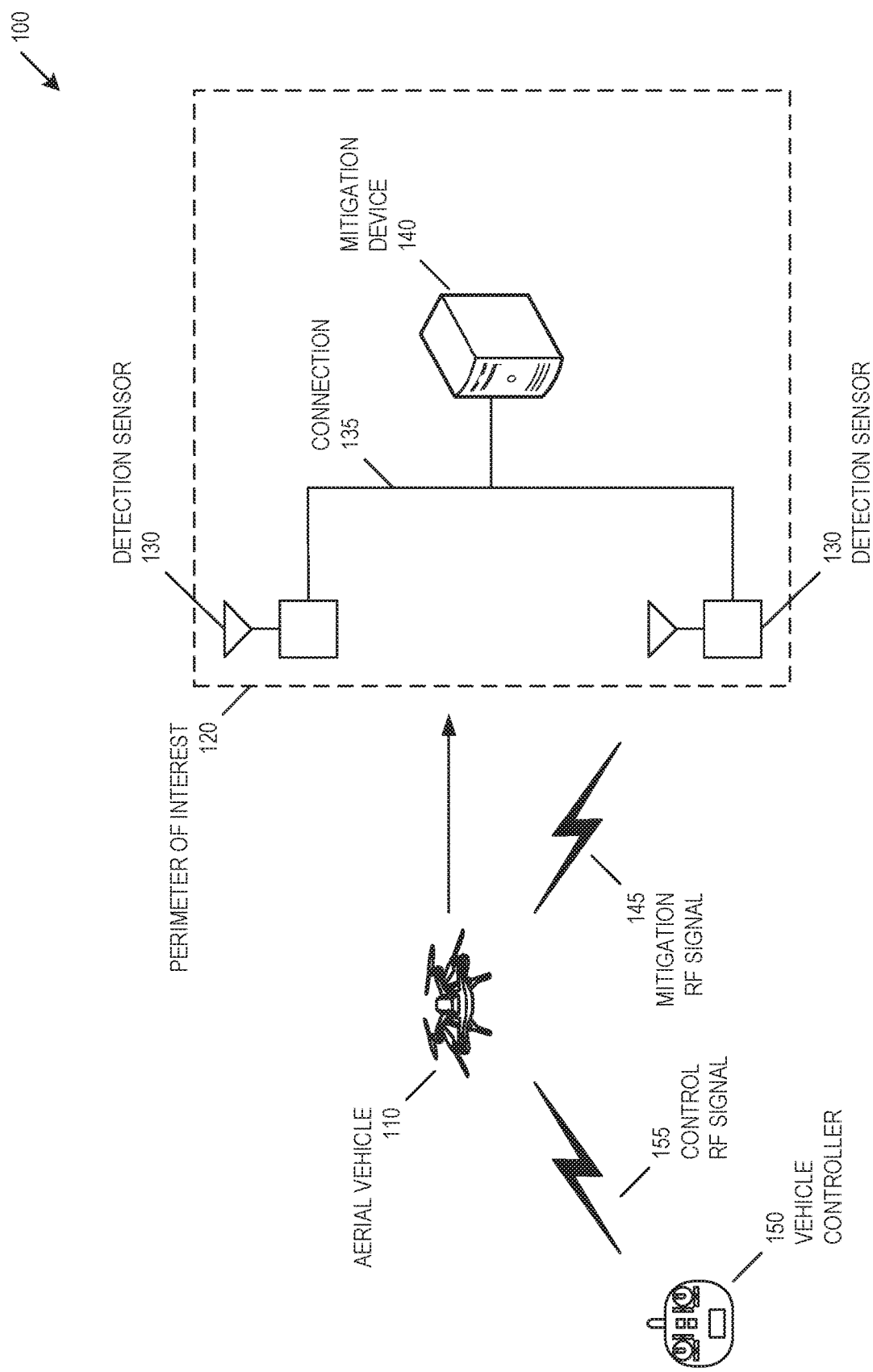
FIG. 1 is a diagram of a UAV detection and mitigation system, in accordance with at least one embodiment.

The present subject matter provides various technical solutions to technical problems facing UAV detection and mitigation. UAV detection and identification may be accomplished by various sensors. Information received from the sensors may be analyzed or matched against known UAV characteristics, such as by matching against a database of UAV characteristics. The analysis or matching may be used to identify the UAV, analyze the UAV characteristics or navigational behavior, and classify the UAV behavior and the UAV itself. The UAV classification may be used to predict future behavior, such as to predict the future navigational behavior. As described herein, the UAV may be classified as either compliant, ignorant (e.g., unintentional) and noncompliant, or purposeful (e.g., intentional) and noncompliant.

The UAV classification may include an artificial intelligence (AI) analysis of UAV characteristics. As used herein, AI analysis is a field concerned with developing decision-making systems to perform cognitive tasks that have traditionally required a living actor, such as a person. The AI analysis of UAV characteristics may be performed by an artificial neural network (ANN) algorithm using specific UAV classifiers described herein. An ANN includes a computational structure that may be loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph-if the threshold is not exceeded then, the value is usually not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers may not know which weights will work for a given application. ANN designers typically choose a number of neuron layers or specific connections between layers including circular connection, but the ANN designer does may not know which weights will work for a given application. Instead, a training process is used to arrive at appropriate weights. However, determining correct synapse weights is common to most ANNs. The training process proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs.

A UAV mitigation command or mitigation response may be generated based on the UAV characteristic analysis combined with a UAV safety risk assessment. The assessment may use risk severity and risk likelihood (e.g., risk probability) indices, as described herein. In response to the UAV classification, a UAV mitigation command may be issued, and a mitigation response may be deployed. In various examples, the mitigation command may cause nondestructive interference, destruction, capture, or another UAV mitigation response. The UAV detection and mitigation provides a defensive counter-UAV strategy for automated UAV threat mitigation systems.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

FIG. 1 is a diagram of a UAV detection and mitigation system 100, in accordance with at least one embodiment. As shown in FIG. 1, the system 100 may include an aerial vehicle 110 traveling toward a perimeter of interest 120. The perimeter of interest 120 may include any previously designated area, such as an airport, a prison, a school, or other designated area. The perimeter of interest 120 may be defined by a perimeter, a minimum or maximum altitude, other geographic or geometric parameters, or other combinations of geographic or geometric parameters. The perimeter of interest 120 may be generated using one or more maps that define prohibited areas (e.g., no-go zones, restricted areas), such as using a basemap (e.g., aeronautical map or topographical map), an airmap, or other maps. Multiple perimeters of interest 120 may be used to define various prohibited areas, such as including a restricted airspace, a restricted groundspace, or other prohibited area. Each perimeter of interest 120 may have multiple associated perimeter zones (not shown), where the associated perimeter zones may be based on a scaled version of the geometry of the particular perimeter of interest 120. For example, an airport may include a perimeter of interest 120 that defines the outermost passive perimeter (e.g., where a UAV is first detected), a middle warning perimeter within the outermost passive perimeter, and an active threat perimeter (e.g., flight path) within the middle warning perimeter. Additional perimeters may be defined that are based on scaled versions of other perimeters, and may be modified based on the additional area with the perimeter, such as by modifying the perimeter to add an area of interest or to exclude a geographic obstacle.

As the aerial vehicle 110 approaches the perimeter of interest 120, one or more detection sensors 130 may detect the aerial vehicle. In the example shown in FIG. 1, the detection sensors 130 may be positioned near corners of the perimeter of interest 120, where the corners may define one side of a perimeter of interest 120. In other examples, the detection sensors 130 may be positioned toward the interior of the perimeter of interest 120, outside the perimeter of interest 120, or in other locations. The detection sensors 130 may be positioned to improve or maximize the ability to detect an aerial vehicle. For example, multiple detection sensors 130 may be used to triangulate the location, direction, speed, or other navigation characteristic of an aerial vehicle 110.

The detection sensors 130 may communication detection sensor data to a UAV mitigation device 140. In various embodiments, detection sensors 130 may have a data communication connection 135 to the UAV mitigation device 140, or one or more detection sensors 130 may be integrated with the UAV mitigation device 140 into a single device. The UAV mitigation device 140 receives various sensor data from detection sensors 130, analyzes the received data, classifies the aerial vehicle 110 into one or more risk categories and compliance categories, and identifies and executes a mitigation response. In an example, the mitigation response includes sending a mitigation radio frequency (RF) signal 145 to the aerial vehicle 110, such as commanding the aerial vehicle 110 to land. In another example, the mitigation response includes sending a mitigation radio frequency (RF) signal 145 to interfere with a control RF signal 155 between a UAV controller 150 and the aerial vehicle 110, where the interference may cause the aerial vehicle 110 to land or maintain current position.

The UAV mitigation device 140 may perform UAV classification based on various types of sensor data received from detection sensors 130. The UAV classification may be based on a UAV model, appearance, operating system, RF communication characteristic, acoustic signature, flight pattern, or other detected characteristics. The UAV classification may use various detected characteristics separately or in combination to narrow down the identification of the UAV to a list of matching UAV models or to a single UAV model, which may be used to determine the UAV classification.

The detection sensors may identify a UAV operating system (OS) based on a detected control RF signal 155, such as by analyzing the radio signature of the detected signal. The UAV OS may be used to identify a list of UAVs that use the identified OS, and in some examples may be used to identify a single UAV model. For example, if the aerial vehicle 110 communicates with a vehicle controller 150 using a control RF signal 155 sent via a Wi-Fi channel, a detection sensor 130 may analyze the Wi-Fi signal characteristics to determine a radio signature, which may be used to identify the UAV OS. Other characteristics may be used to identify a UAV OS, such as using network traffic security scanners, response to an interfering OS test RF signal, or other characteristics.

The detection sensors may identify a UAV through its registration. In the United States, the Federal Aviation Regulations (FAR) are codified in Title 14 of the Code of Federal Regulations (C.F.R.). The FAR mandates registration of UAVs under 14 C.F.R. 107 and marking of the UAV with the registration number. The registration information marked on an aerial vehicle 110 may be captured in an image by a detection sensor 130 (e.g., image sensor, camera), and the registration information may be cross-checked against a database of registered UAVs. The registration database may include the UAV type (e.g., model number, serial number, manufacturer name), UAV OS, operator name, and other information about the UAV or its registered operator. Not all UAVs are currently registered, and the lack of registration may also be used to classify the UAV or to narrow down the identification of the UAV to a list of matching UAV models.

The detection sensors may identify a UAV through one or more visual markers, audible markers, or ranging sensor information. In an example, a detection sensor 130 may include an audio sensor to capture audio generated by UAV propellers. The audio may be analyzed to identify a UAV audio signature, and the audio signature may be matched against a database of UAV audio signatures to identify a UAV type. In another example, a detection sensor 130 may include an image sensor to capture an image of the UAV structure, which may be used to identify a UAV type. The UAV image may also be used to identify whether a modification was made to a UAV, such as identifying a UAV payload, user-installed sensors, or other UAV modifications. Multiple UAV images may be used to identify UAV flight characteristics, such as the flight pattern, origin, destination, or other flight characteristics. Multiple image capture devices may be used at one or more detection sensors 130 to capture images from separate locations, and the images may be combined to improve identification of the UAV, identification of UAV flight patterns, identification of registration number, or other characteristics. For example, while a single camera may be used to identify an azimuth angle or angular velocity of a UAV, combining images from a pair of cameras may be used to identify a location or groundspeed of a UAV. Various ranging sensors may also be used to identify the location or flight pattern of a UAV, such as radar, lidar, sonar, or other ranging sensors.

Figure 2:
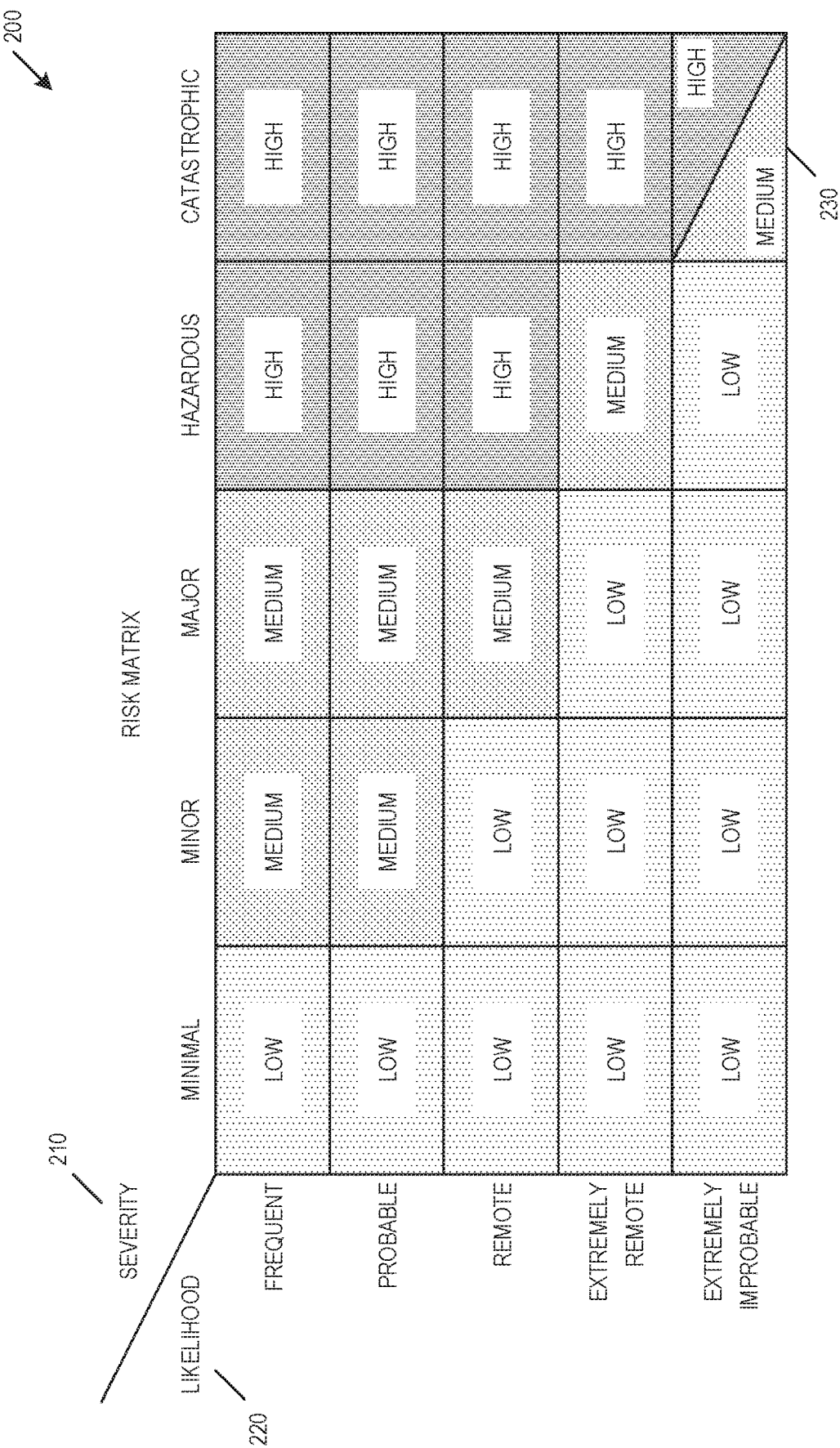
FIG. 2 is a diagram of a UAV risk matrix, in accordance with at least one embodiment.

FIG. 2 is a diagram of a UAV risk matrix 200, in accordance with at least one embodiment. A UAV may be assigned a risk severity 210 and a risk likelihood 220 based on various detected UAV characteristics, such as UAV identification, UAV flight pattern, and other characteristics. The risk likelihood 220 may represent a probability that the UAV may encroach on or fly over a perimeter of interest or an object within the perimeter of interest. For example, risk likelihood 220 may indicate how likely the detected UAV is to cross a perimeter of an airport or a crowded area. The risk likelihood 220 may be based on a combination of a geographic component (e.g., flight pattern), a demographic component (e.g., population density), or other components. The risk likelihood 220 may include categories describing this probability, such as an extremely improbable category, an extremely remote category, a remote category, a probable category, and a frequent category.

The risk severity 210 may be based on potential effects of the UAV flight pattern. The risk severity 210 categories may include a minimal risk (e.g., trespass), a minor risk (e.g., property damage), a major risk (e.g., a freeway overflight), a hazardous risk (e.g., crowd overflight), or a catastrophic risk (e.g., a collision with a passenger airliner). The risk severity 210 may be determined based on one or more perimeter zones associated with a perimeter of interest 120 described above. In the airport example, a minimal severity may be assigned to a UAV within an outermost passive perimeter (e.g., flying over any airport property), a major severity may be assigned to a UAV within a middle warning perimeter (e.g., airport terminal overflight), and a catastrophic severity may be assigned to a UAV within an active threat perimeter (e.g., flight path).

Each combination of a risk severity 210 and a risk likelihood 220 may be assigned an associated UAV flight risk level, such as a low flight risk level, a medium flight risk level, or a high flight risk level. In various examples shown in FIG. 2, an extremely improbable likelihood with a minimal severity may be associated with a low flight risk level, a remote likelihood with a major severity may be associated with a medium flight risk level, and frequent likelihood with a catastrophic severity may be associated with a high flight risk level. A flight risk level may be allocated to each combination of risk severity 210 and a risk likelihood 220. In an embodiment, multiple risks are associated with an improbable and catastrophic category 230: the risk level may default to a medium risk, but may be upgraded to a high risk if the catastrophic risk severity is associated with a single point of failure or a common cause failure.

Figure 3:
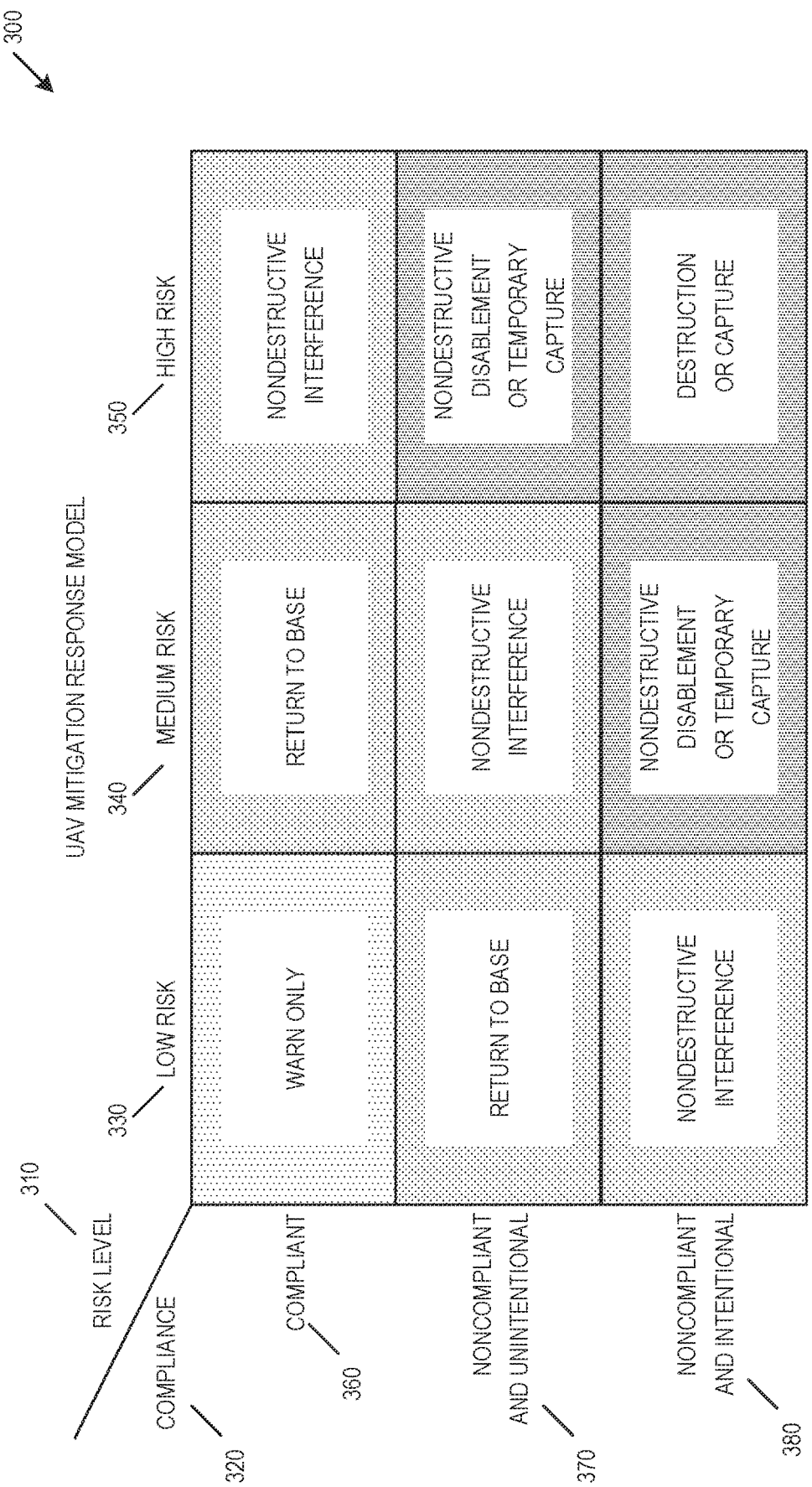
FIG. 3 is a diagram of a UAV mitigation response model, in accordance with at least one embodiment.

FIG. 3 is a diagram of a UAV mitigation response model 300, in accordance with at least one embodiment. Within the mitigation response model 300, a UAV may be assigned a risk level 310 and a compliance classification 320. The risk level 310 may be determined based on UAV risk matrix 200 described above, and may include a low risk level 330, a medium risk level 340, and a high risk level 350. The UAV mitigation response model 300 may assign a compliance classification 320 to a UAV or to at least portion of a UAV flight based on various UAV characteristics, such as UAV characteristics identified by a detection sensor 130 and mitigation device 140. The compliance classification 320 may be assigned by an ANN, as described herein. The compliance classification 320 may include a compliant behavior 360, which may be assigned when a UAV is using an approved RF band, is using UAV control messages that follow standard protocols (e.g., commercial RF signature, timestamps), and is complying with requirements under 14 C.F.R. 107, such as complying with UAV registration requirements, maximum altitude, maximum speed, minimum distances from people or structures, and other FAR requirements. A UAV conforming to requirements of compliant behavior 360 may be assigned a primary binary classifier of "0," whereas a noncompliant UAV may be assigned a primary binary classifier of "1." In response to a primary binary classifier of "1," the UAV mitigation response model 300 may continue to test for types of noncompliant behavior to determine the secondary binary classifier.

When a UAV is determined to be noncompliant with requirements under UAVs under 14 C.F.R. 107, the UAV mitigation response model 300 may determine whether the noncompliance is noncompliant and unintentional 370 or noncompliant and intentional 380. A UAV noncompliance behavior may be determined to be unintentional (e.g., ignorant) or intentional (e.g., purposeful) based on various factors, such as complying with property boundaries, UAV registration requirements, maximum altitude, maximum speed, minimum distances from people, structures, visible boundaries, or other factors. In an embodiment, trespassing over a perimeter of interest may be weighted more heavily than other factors in determining the compliance classification 320. For example, trespassing over obvious and marked boundaries, such as an airport perimeter fence or a prison wall, may be classified as noncompliant and intentional 380.

A set of nearby property types may provide mitigating factors in determining UAV compliance, such as flight paths consistent with particular UAV uses. For example, a farm adjacent to a prison may fly a UAV in long, serpentine flight paths to apply fertilizer or capture precision agriculture images, and a UAV adjacent to a prison boundary may be classified as compliant 360 based on flight paths consistent with agricultural UAVs. In another example, a UAV adjacent to a prison boundary may be classified as noncompliant and intentional 380 based on flight paths consistent with prison surveillance, such as following a prison perimeter or hovering in place.

Similarly, a UAV whose flight path consistently respects a property boundary but temporarily trespasses over that property boundary may be classified as a momentary noncompliance incident. For example, a UAV may be blown over a property line by a wind gust and immediately return to a previous location before the temporary trespass. In an example, a compliant behavior 360 classification may be converted to noncompliant and unintentional 370 or noncompliant and intentional 380 after exceeding a threshold number of momentary noncompliance incidents, such as three momentary noncompliance incidents by a registered and identified UAV within a day or other predetermined time interval.

A noncompliant and unintentional behavior 370 may also be assigned when a UAV is not complying with requirements under 14 C.F.R. 107, but is using an approved RF band and is using UAV control messages that follow standard UAV protocols. A noncompliant and intentional behavior 380 may be assigned when a UAV is not complying with any of these criteria, such as requirements under 14 C.F.R. 107, using an approved RF band, or using UAV control messages that follow standard protocols. Examples of not using an approved RF band or using control messages that follow standard protocols may include an RF signal that does not match known UAV controller signal characteristics (e.g., is not matched within a database of known UAV controller signal characteristics), or a UAV that appears to be flying without sending or receiving RF control signals (e.g., fully autonomous flight). A noncompliant and intentional behavior 380 may be associated with a homemade UAV configuration (e.g., a "homebrew") or with criminal activity.

Because UAV characteristics and flight activity may change over time, the UAV mitigation response model 300 may associate a compliance classification 320 with a portion of a UAV flight, such as a time interval or a portion of a flight pattern. For example, a properly registered and marked UAV may conform to all compliant behavior 360 for most of a flight, but the same registered UAV may subsequently fly through a restricted airspace or other prohibited area. A UAV conforming to requirements of noncompliant and intentional 370 may be assigned a secondary binary classifier of "0," whereas a noncompliant and unintentional 380 may be assigned a secondary binary classifier of "1."

This classification system, including the use of the ANN as described below, enables the UAV detection and mitigation system to learn site-specific events and exceptions. In an example, the threshold number of momentary noncompliance incidents may be modified dynamically by the UAV detection and mitigation system based on the learned site-specific events and exceptions.

Once a UAV has been assigned a risk level 310 and a compliance classification 320, the mitigation response model 300 may identify one or more mitigation responses shown in FIG. 3. A mitigation response may include warning an operator, such as when a UAV is identified to be low risk 330 and compliant 360. A mitigation response may include commanding the UAV to return to base, such as when a UAV is identified to be (a) low risk 330 and noncompliant and unintentional 370 or (b) medium risk 340 and compliant 360. Many UASs (e.g., UAV and vehicle controller) have a control loss-link functionality that causes the UAV to return to a predetermined base location, and the mitigation response may include causing sufficient interference with the control loss-link functionality to cause the UAV to return to the base location. A mitigation response may include nondestructive interference of the UAV, such as when a UAV is identified to be (a) low risk 330 and noncompliant and intentional 380, (b) medium risk 340 and noncompliant and unintentional 370, or (c) high risk 350 and compliant 360. The nondestructive interference may include causing an interfering command signal to be sent to the UAV, where the interfering command signal may cause the UAV to hover in place or to land in place. A mitigation response may include nondestructive disablement or temporary capture of the UAV, such as when a UAV is identified to be (a) medium risk 340 and noncompliant and intentional 380 or (b) high risk 350 and noncompliant and unintentional 370. The nondestructive disablement or temporary capture may include ensnaring the UAV in a net, causing a nondestructive substance (e.g., conductive fluid, expanding foam) to be applied to an exterior or interior of the UAV, or causing non-damaging electronic interference (e.g., jamming). In an example, the non-damaging electronic interference causes the UAV to land immediately but not to disconnect from the UAV controller. A mitigation response may include destructive disablement or permanent capture of the UAV, such as when a UAV is identified to be (a) high risk 350 and noncompliant and intentional 380. The destructive disablement or permanent capture may include causing a projectile to destroy at least a portion of the UAV, or causing a damaging electronic interference at a power level sufficient to cause permanent damage to UAV electronic components.

Figure 4:
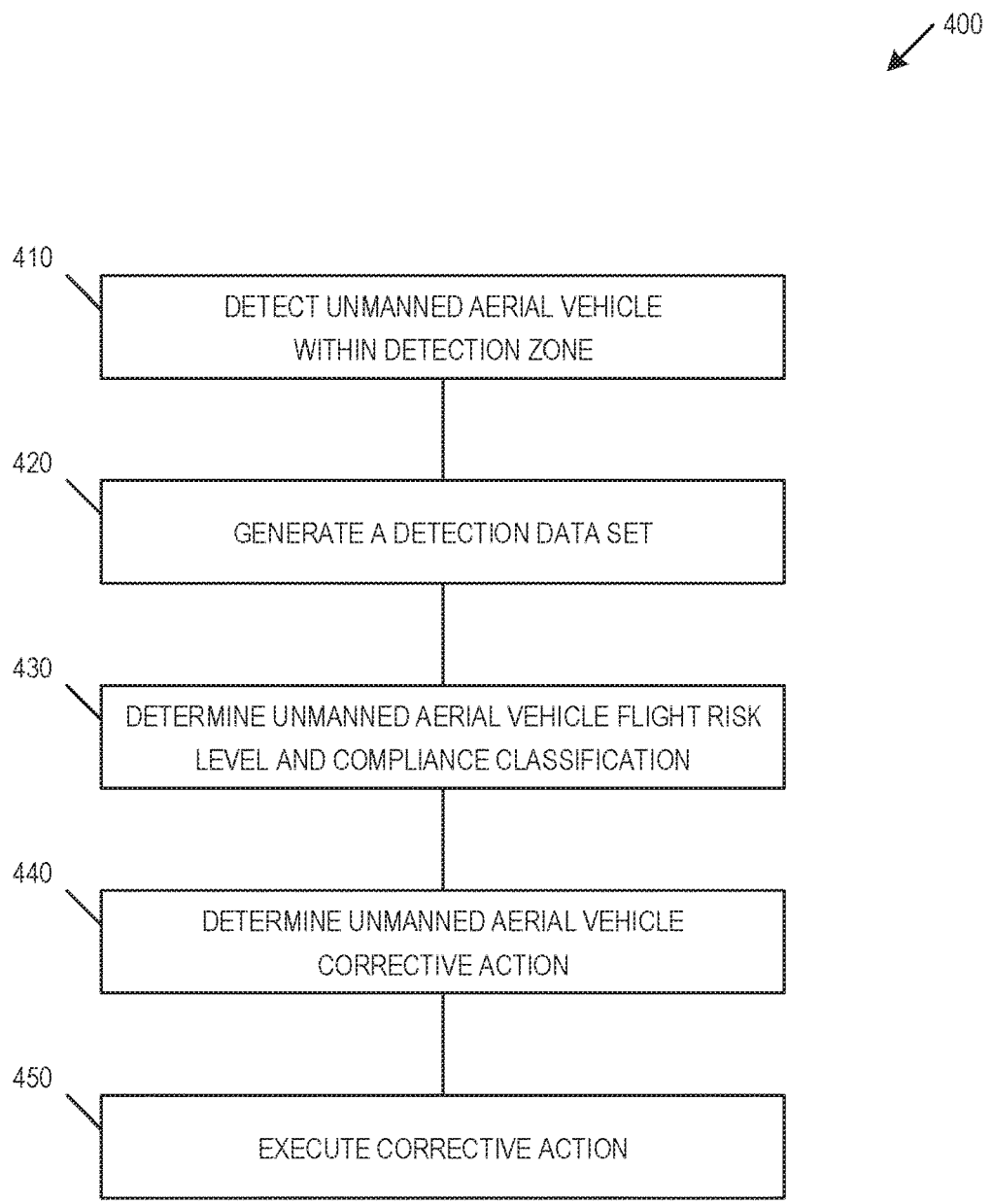
FIG. 4 is a diagram of a UAV detection and mitigation method, in accordance with at least one embodiment.

FIG. 4 is a UAV detection and mitigation method 400, according to an example embodiment. Method 400 may include detecting 410 a UAV with a detection zone. Method 400 may include generating 420 a UAV detection data set received from a UAV detection sensor. The detection data set may include an aerial vehicle identification, an aerial vehicle location, and other information.

Method 400 may include determining 430 an unmanned aerial vehicle flight risk level and a compliance classification based on the detection data set. The determination of the compliance classification may include classifying the detection data set as one of a compliant flight behavior, an unintentional noncompliant flight behavior, or an intentional noncompliant flight behavior. The determination of the compliance classification may include an aerial vehicle classification engine. The aerial vehicle classification engine may be previously trained with a labeled input data set for supervised learning. The labeled input data set may include a plurality of previously classified unmanned aerial vehicle detection sensor data. The determination of the compliance classification may include training the aerial vehicle classification engine with an unlabeled input data set for unsupervised learning, the unlabeled input data set including the detection data set from the unmanned aerial vehicle detection sensor.

The flight risk level may include at least one of a high flight risk level, a medium flight risk level, and a low flight risk level. The aerial vehicle risk level may include a likelihood probability and a risk severity. The likelihood probability is based on a combination of the aerial vehicle location, the detection zone, and a detection zone demographic. The risk severity may include a trespass minimal risk, a property damage minor risk, a freeway overflight major risk, a crowd overflight hazardous risk, or a commercial airline collision catastrophic risk.

Method 400 may include determining 440 an unmanned aerial vehicle corrective action based on the flight risk level and the compliance classification. Method 400 may include causing an unmanned aerial vehicle mitigation device to execute 450 the corrective action. The corrective action may include a nondestructive interference; and the mitigation device generates a radio frequency interference signal to interrupt a navigation communication between the aerial vehicle and an aerial vehicle control device. The corrective action may include a nondestructive interference when the risk level is determined to include at least one of: the unintentional noncompliant flight behavior in the high flight risk level; and the intentional noncompliant flight behavior in the medium flight risk level. The corrective action may include a nondestructive disablement, and the mitigation device may generate a radio frequency disablement signal to disable the aerial vehicle. The corrective action may include a temporary capture, and the mitigation device may deploy an aerial vehicle temporary capture countermeasure. The corrective action may include a nondestructive disablement when the risk level is determined to include the intentional noncompliant flight behavior in the high flight risk level. The corrective action may include a destructive disablement, and the mitigation device may generate a radio frequency disablement signal to disable the aerial vehicle. The corrective action may include a permanent capture; and the mitigation device may deploy an aerial vehicle permanent capture countermeasure.

Figure 5:
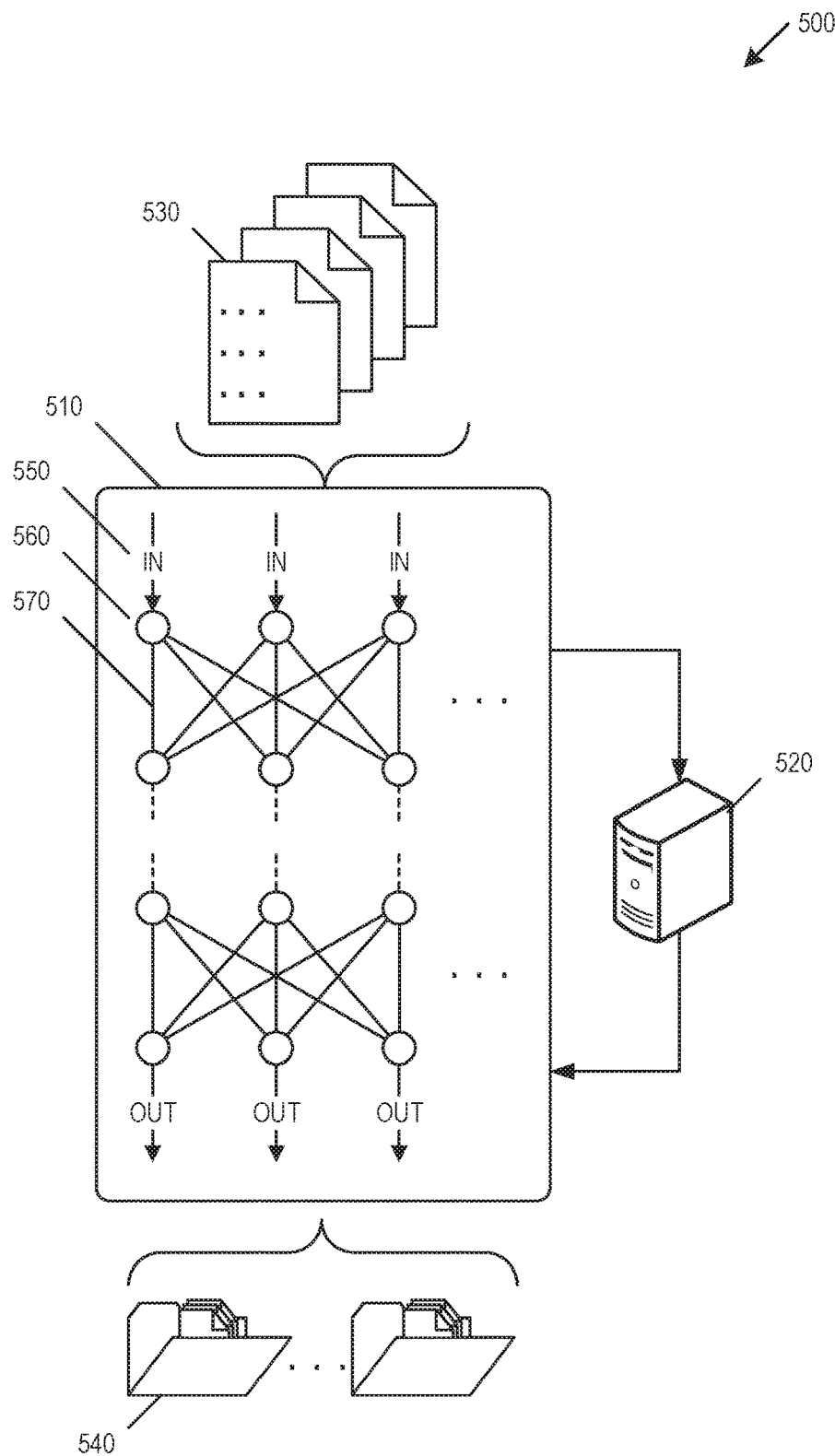
FIG. 5 is a block diagram of an example neural network training system for UAV detection and mitigation, according to an embodiment.

FIG. 5 is a block diagram of an example neural network training system 500 for UAV detection and mitigation, according to an embodiment. The UAV detection and mitigation system 500 includes an ANN 510 that is trained using a processing node 520. The processing node 520 may be a CPU, GPU, field programmable gate array (FPGA), digital signal processor (DSP), application specific integrated circuit (ASIC), or other processing circuitry. In an example, multiple processing nodes may be employed to train different layers of the ANN 510, or even different nodes 560 within layers. Thus, a set of processing nodes 520 is arranged to perform the training of the ANN 510.

The set of processing nodes 520 is arranged to receive a training set 530 for the ANN 510. The training set 530 may include previously stored data from one or more UAV detection sensors. The ANN 510 comprises a set of nodes 560 arranged in layers (illustrated as rows of nodes 560) and a set of inter-node weights 570 (e.g., parameters) between nodes in the set of nodes. In various embodiments, an ANN 510 may use as few as two layers of nodes, or the ANN 510 may use as many as ten or more layers of nodes. The number of nodes 560 or number of node layers may be selected based on the type and complexity of the UAV detection and mitigation system. In various examples, the ANN 510 includes a node layer corresponding to multiple sensor types, a node layer corresponding to multiple perimeters of interest, and a node layer corresponding to compliance with requirements under 14 C.F.R. 107. In an example, the training set 530 is a subset of a complete training set of data from one or more UAV detection sensors. Here, the subset may enable processing nodes with limited storage resources to participate in training the ANN 510.

The training data may include multiple numerical values representative of a UAV compliance classification 540, such as compliant, noncompliant unintentional, and noncompliant intentional. During training, each value of the training is provided to a corresponding node 560 in the first layer or input layer of ANN 510. Once ANN 510 is trained, each value of the input 550 to be classified is similarly provided to a corresponding node 560 in the first layer or input layer of ANN 510. The values propagate through the layers and are changed by the objective function.

As noted above, the set of processing nodes is arranged to train the neural network to create a trained neural network. Once trained, the input UAV detection data 550 will be assigned into categories such that data input into the ANN 510 will produce valid UAV compliance classifications 540. Training may include supervised learning, where portions of the training data set are labeled using UAV compliance classifications 540. After an initial supervised learning is completed, the ANN 510 may undergo unsupervised learning, where the training data set is not labeled using UAV compliance classifications 540. For example, the ANN 510 may be trained initially by supervised learning using previously classified UAV detection data, and subsequently trained by unsupervised learning using newly collected UAV detection data. This unsupervised learning using newly collected UAV detection data enables the system to adapt to a specific UAV detection and mitigation site, including the site geography, perimeters of interest, number and types of UAV sensors, and other site-specific information. This unsupervised learning also enables the system to adapt to changes in the UAV detection and mitigation site, such as modifications to perimeters of interest, adding additional UAV sensors, and other site-specific changes.

The training performed by the set of processing nodes 560 is iterative. In an example, each iteration of the training the neural network is performed independently between layers of the ANN 510. Thus, two distinct layers may be processed in parallel by different members of the set of processing nodes. In an example, different layers of the ANN 510 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 560 (e.g., neurons) are trained independently. In an example, the nodes are trained on different hardware.

The number and types of UAV compliance classifications 540 may be modified to add, remove, or modify UAV compliance classifications 540. This may enable the ANN 510 to be updated via software, which may enable modification of the UAV detection and mitigation system without replacing the entire system. A software update of the UAV compliance classifications 540 may include initiating additional supervised learning based on a newly provided set of input data with associated UAV compliance classifications 540. A software update of the UAV compliance classifications 540 may include replacing the currently trained ANN 510 with a separate ANN 510 trained using a distinct set of input data or UAV compliance classifications 540.

Figure 6:
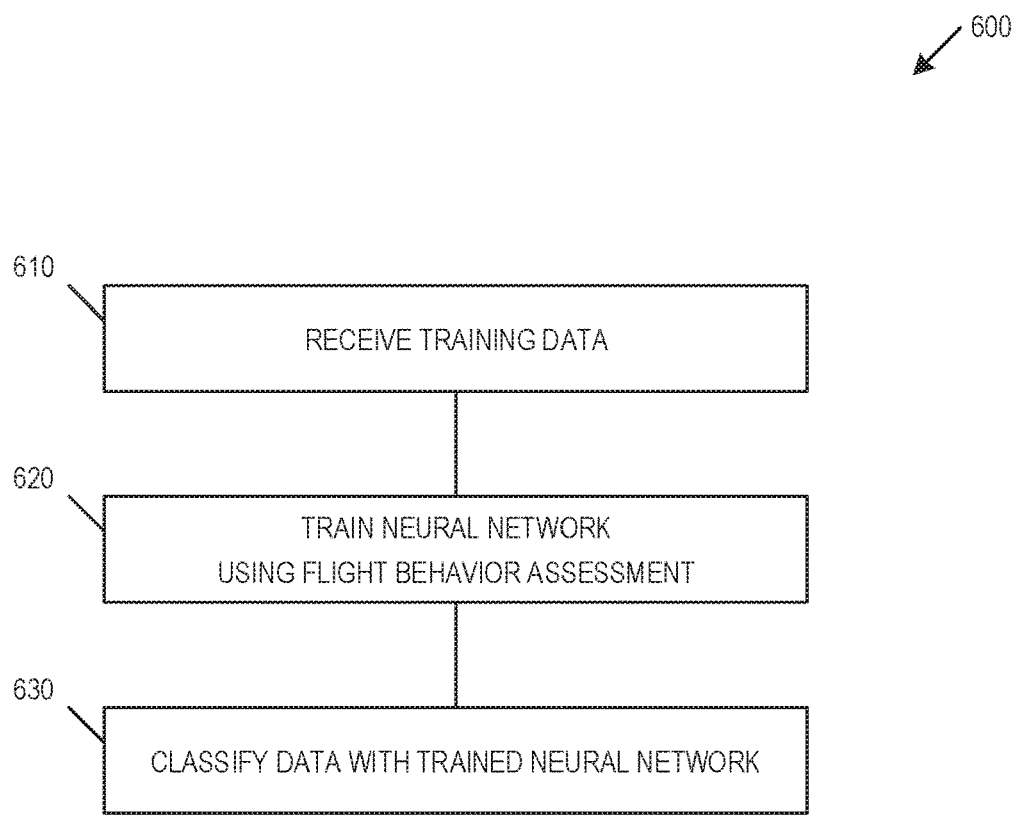
FIG. 6 illustrates a flow diagram of an example of a neural network training method for UAV detection and mitigation, according to an embodiment.

FIG. 6 illustrates a flow diagram of an example of a neural network training method 600 for UAV detection and mitigation, according to an embodiment. The operations of the method 600 are implemented in electronic hardware, such as that described above or below (e.g., processing circuitry). Method 600 includes receiving 610 a training set for a neural network, where the training set includes UAV sensor data and associated UAV compliance classifications. Here, the neural network includes a set of nodes arranged in layers and a set of inter-node weights between nodes in the set of nodes. In an example, the training set is a subset of a complete training set of UAV sensor data and associated UAV compliance classifications. Method 600 includes iteratively training the neural network 620 to create a trained neural network. In an example, each iteration of training the neural network is performed independently between layers of the neural network. In an example, different layers of the neural network are trained on different hardware. In an example, each iteration of the training is performed independently between nodes in the set of nodes. In an example, nodes of the neural network are trained on different hardware. Method 600 includes classifying data 630 using the trained neural network, such as receiving newly generated UAV sensor data and assigning a UAV compliance classification. The output of the classified data may include UAV classification selections from among those UAV compliance classifications shown in the UAV mitigation response model 300.

Figure 7:
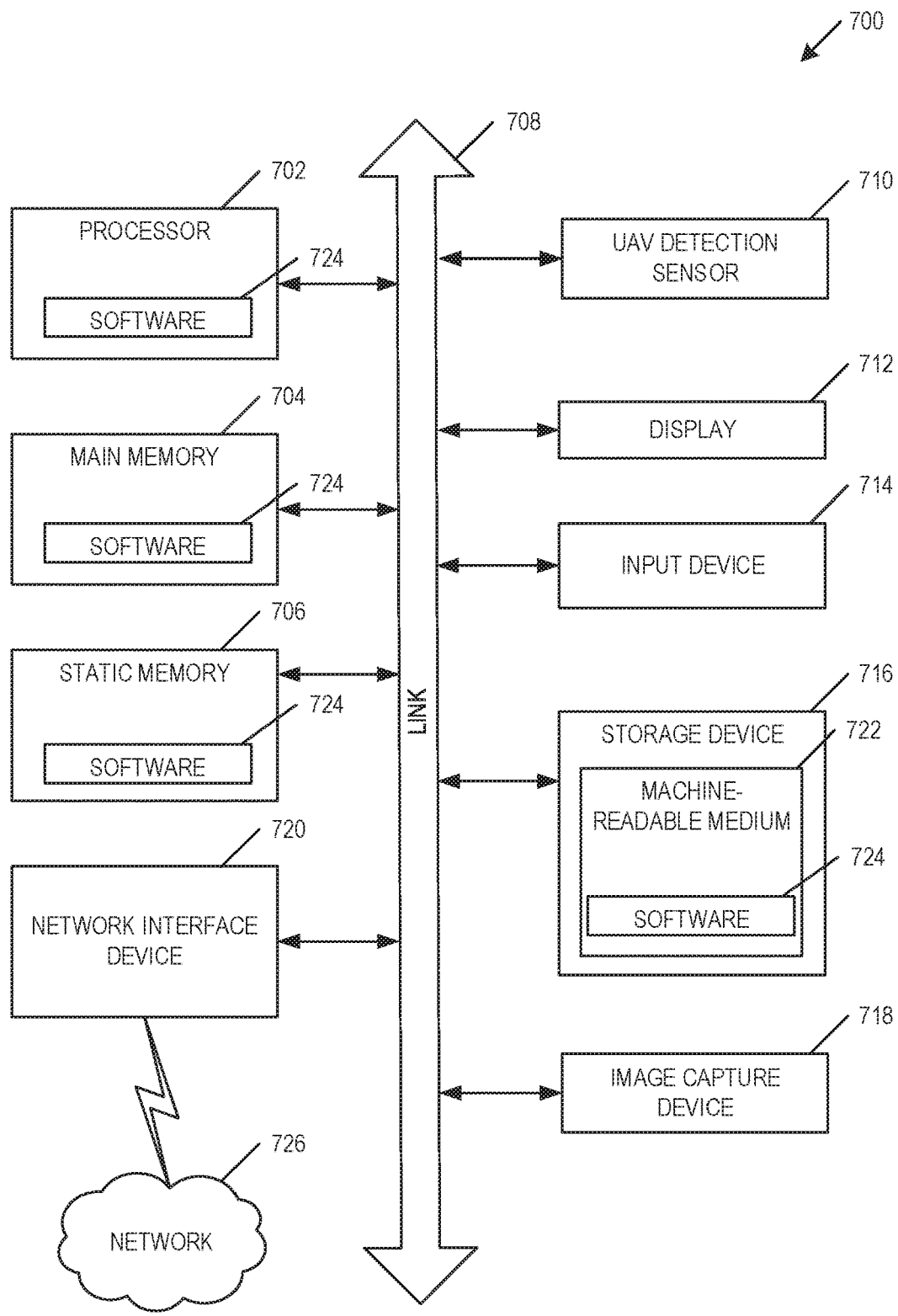
FIG. 7 is a block diagram illustrating a UAV detection and mitigation system in an example form of an electronic device in an example form of an electronic device, according to an example embodiment.

FIG. 7 is a block diagram illustrating a UAV detection and mitigation system in an example form of an electronic device 700, within which a set or sequence of instructions may be executed to cause the machine to perform any one of the methodologies discussed herein, according to an example embodiment. Electronic device 700 may represent a single device or a system of multiple devices combined to provide UAV detection and mitigation. In alternative embodiments, the electronic device 700 operates as a standalone device or may be connected (e.g., networked) to other machines. In a networked deployment, the electronic device 700 may operate in the capacity of either a server or a client machine in server-client network environments, or it may act as a peer machine in peer-to-peer (or distributed) network environments. The electronic device 700 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, a server computer, or any electronic device 700 capable of executing instructions (sequential or otherwise) that specify actions to be taken by that machine to detect a user input. Further, while only a single electronic device 700 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The main memory 704 or static memory 706 may be used to store navigation data (e.g., predetermined waypoints) or payload data (e.g., stored captured images).

The electronic device 700) may include one or more UAV detection sensors 710, which may provide various UAV detection data to perform the detection and mitigation processes described above. The electronic device 700 may further include a display unit 712, where the display unit 712 may include a single component that provides a user-readable display and a protective layer, or another display type. The electronic device 700 may further include an input device 714, such as a pushbutton, a keyboard, or a user interface (UI) navigation device (e.g., a mouse or touch-sensitive input). The electronic device 700 may additionally include a storage device 716, such as a drive unit. The electronic device 700 may additionally include one or more image capture devices 718 to capture images with different fields of view as described above. The electronic device 700 may additionally include a network interface device 720, and one or more additional sensors (not shown).

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, or within the processor 702 during execution thereof by the electronic device 700. The main memory 704, static memory 706, and the processor 702 may also constitute machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is an unmanned aerial vehicle detection and mitigation system comprising: an unmanned aerial vehicle detection sensor to detect an unmanned aerial vehicle within a detection zone and generate a detection data set, the detection data set including an aerial vehicle identification and an aerial vehicle location; an unmanned aerial vehicle mitigation device; one or more processors; one or more storage devices comprising instructions, which when executed by the one or more processors, configure the one or more processors to: receive the detection data set from the unmanned aerial vehicle detection sensor; determine an unmanned aerial vehicle flight risk level and a compliance classification based on the detection data set; determine an unmanned aerial vehicle corrective action based on the flight risk level and the compliance classification; and cause the unmanned aerial vehicle mitigation device to execute the corrective action.

In Example 2, the subject matter of Example 1 optionally includes wherein the determination of the compliance classification includes classifying the detection data set as one of a compliant flight behavior, an unintentional noncompliant flight behavior, or an intentional noncompliant flight behavior.

In Example 3, the subject matter of Example 2 optionally includes wherein the determination of the compliance classification based on the detection data set includes an aerial vehicle classification engine stored in the one or more storage devices, the aerial vehicle classification engine previously trained with a labeled input data set for supervised learning, the labeled input data set including a plurality of previously classified unmanned aerial vehicle detection sensor data.

In Example 4, the subject matter of Example 3 optionally includes wherein the determination of the compliance classification based on the detection data set includes training the aerial vehicle classification engine with an unlabeled input data set for unsupervised learning, the unlabeled input data set including the detection data set from the unmanned aerial vehicle detection sensor.

In Example 5, the subject matter of any one or more of Examples 2-4 optionally include wherein the flight risk level includes at least one of a high flight risk level, a medium flight risk level, and a low flight risk level.

In Example 6, the subject matter of Example 5 optionally includes wherein: the corrective action includes a nondestructive interference; and the mitigation device generates a radio frequency interference signal to interrupt a navigation communication between the aerial vehicle and an aerial vehicle control device.

In Example 7, the subject matter of any one or more of Examples 2-6 optionally include wherein the risk level is determined to include at least one of: the unintentional noncompliant flight behavior in the high flight risk level; and the intentional noncompliant flight behavior in the medium flight risk level.

In Example 8, the subject matter of Example 7 optionally includes wherein: the corrective action includes a nondestructive disablement; and the mitigation device generates a radio frequency disablement signal to disable the aerial vehicle.

In Example 9, the subject matter of any one or more of Examples 7-8 optionally include wherein: the corrective action includes a temporary capture; and the mitigation device deploys an aerial vehicle temporary capture countermeasure.

In Example 10, the subject matter of any one or more of Examples 2-9 optionally include wherein the risk level is determined to include the intentional noncompliant flight behavior in the high flight risk level.

In Example 11, the subject matter of Example 10 optionally includes wherein: the corrective action includes a destructive disablement; and the mitigation device generates a radio frequency disablement signal to disable the aerial vehicle.

In Example 12, the subject matter of any one or more of Examples 10-11 optionally include wherein: the corrective action includes a permanent capture; and the mitigation device deploys an aerial vehicle permanent capture countermeasure.

In Example 13, the subject matter of any one or more of Examples 2-12 optionally include wherein the aerial vehicle risk level includes a likelihood probability and a risk severity.

In Example 14, the subject matter of Example 13 optionally includes wherein the likelihood probability is based on a combination of the aerial vehicle location, the detection zone, and a detection zone demographic.

In Example 15, the subject matter of any one or more of Examples 13-14 optionally include wherein the risk severity includes: a trespass minimal risk; a property damage minor risk; a freeway overflight major risk; a crowd overflight hazardous risk; or a commercial airline collision catastrophic risk.

Example 16 is an unmanned aerial vehicle detection and mitigation method comprising: detecting an unmanned aerial vehicle within a detection zone; generating a detection data set, the detection data set including an aerial vehicle identification and an aerial vehicle location; receiving the detection data set from an unmanned aerial vehicle detection sensor; determining an unmanned aerial vehicle flight risk level and a compliance classification based on the detection data set; determining an unmanned aerial vehicle corrective action based on the flight risk level and the compliance classification; and causing an unmanned aerial vehicle mitigation device to execute the corrective action.

In Example 17, the subject matter of Example 16 optionally includes wherein the determination of the compliance classification includes classifying the detection data set as one of a compliant flight behavior, an unintentional noncompliant flight behavior, or an intentional noncompliant flight behavior.

In Example 18, the subject matter of Example 17 optionally includes wherein the determination of the compliance classification based on the detection data set includes an aerial vehicle classification engine stored in the one or more storage devices, the aerial vehicle classification engine previously trained with a labeled input data set for supervised learning, the labeled input data set including a plurality of previously classified unmanned aerial vehicle detection sensor data.

In Example 19, the subject matter of Example 18 optionally includes wherein the determination of the compliance classification based on the detection data set includes training the aerial vehicle classification engine with an unlabeled input data set for unsupervised learning, the unlabeled input data set including the detection data set from the unmanned aerial vehicle detection sensor.

In Example 20, the subject matter of any one or more of Examples 17-19 optionally include wherein the flight risk level includes at least one of a high flight risk level, a medium flight risk level, and a low flight risk level.

In Example 21, the subject matter of Example 20 optionally includes wherein: the corrective action includes a nondestructive interference; and the mitigation device generates a radio frequency interference signal to interrupt a navigation communication between the aerial vehicle and an aerial vehicle control device.

In Example 22, the subject matter of any one or more of Examples 17-21 optionally include wherein the risk level is determined to include at least one of: the unintentional noncompliant flight behavior in the high flight risk level; and the intentional noncompliant flight behavior in the medium flight risk level.

In Example 23, the subject matter of Example 22 optionally includes wherein: the corrective action includes a nondestructive disablement; and the mitigation device generates a radio frequency disablement signal to disable the aerial vehicle.

In Example 24, the subject matter of any one or more of Examples 22-23 optionally include wherein: the corrective action includes a temporary capture; and the mitigation device deploys an aerial vehicle temporary capture countermeasure.

In Example 25, the subject matter of any one or more of Examples 17-24 optionally include wherein the risk level is determined to include the intentional noncompliant flight behavior in the high flight risk level.

In Example 26, the subject matter of Example 25 optionally includes wherein: the corrective action includes a destructive disablement; and the mitigation device generates a radio frequency disablement signal to disable the aerial vehicle.

In Example 27, the subject matter of any one or more of Examples 25-26 optionally include wherein: the corrective action includes a permanent capture; and the mitigation device deploys an aerial vehicle permanent capture countermeasure.

In Example 28, the subject matter of any one or more of Examples 17-27 optionally include wherein the aerial vehicle risk level includes a likelihood probability and a risk severity.

In Example 29, the subject matter of Example 28 optionally includes wherein the likelihood probability is based on a combination of the aerial vehicle location, the detection zone, and a detection zone demographic.

In Example 30, the subject matter of any one or more of Examples 28-29 optionally include wherein the risk severity includes: a trespass minimal risk; a property damage minor risk; a freeway overflight major risk; a crowd overflight hazardous risk; or a commercial airline collision catastrophic risk.

Example 31 is one or more machine-readable medium including instructions, which when executed by a computing system, cause the computing system to perform any of the methods of Examples 16-30.

Example 32 is an apparatus comprising means for performing any of the methods of Examples 16-30.

Example 33 is at least one machine-readable storage medium, comprising a plurality of instructions that, responsive to being executed with processor circuitry of a computer-controlled device, cause the computer-controlled device to: detect an unmanned aerial vehicle within a detection zone; generate a detection data set, the detection data set including an aerial vehicle identification and an aerial vehicle location; receive the detection data set from an unmanned aerial vehicle detection sensor; determine an unmanned aerial vehicle flight risk level and a compliance classification based on the detection data set; determine an unmanned aerial vehicle corrective action based on the flight risk level and the compliance classification; and cause an unmanned aerial vehicle mitigation device to execute the corrective action.

In Example 34, the subject matter of Example 33 optionally includes wherein the determination of the compliance classification includes classifying the detection data set as one of a compliant flight behavior, an unintentional noncompliant flight behavior, or an intentional noncompliant flight behavior.

In Example 35, the subject matter of Example 34 optionally includes wherein the determination of the compliance classification based on the detection data set includes an aerial vehicle classification engine stored in the one or more storage devices, the aerial vehicle classification engine previously trained with a labeled input data set for supervised learning, the labeled input data set including a plurality of previously classified unmanned aerial vehicle detection sensor data.

In Example 36, the subject matter of Example 35 optionally includes wherein the determination of the compliance classification based on the detection data set includes training the aerial vehicle classification engine with an unlabeled input data set for unsupervised learning, the unlabeled input data set including the detection data set from the unmanned aerial vehicle detection sensor.

In Example 37, the subject matter of any one or more of Examples 34-36 optionally include wherein the flight risk level includes at least one of a high flight risk level, a medium flight risk level, and a low flight risk level.

In Example 38, the subject matter of Example 37 optionally includes wherein: the corrective action includes a nondestructive interference; and the mitigation device generates a radio frequency interference signal to interrupt a navigation communication between the aerial vehicle and an aerial vehicle control device.

In Example 39, the subject matter of any one or more of Examples 34-38 optionally include wherein the risk level is determined to include at least one of: the unintentional noncompliant flight behavior in the high flight risk level; and the intentional noncompliant flight behavior in the medium flight risk level.

In Example 40, the subject matter of Example 39 optionally includes wherein: the corrective action includes a nondestructive disablement; and the mitigation device generates a radio frequency disablement signal to disable the aerial vehicle.

In Example 41, the subject matter of any one or more of Examples 39-40 optionally include wherein: the corrective action includes a temporary capture; and the mitigation device deploys an aerial vehicle temporary capture countermeasure.

In Example 42, the subject matter of any one or more of Examples 34-41 optionally include wherein the risk level is determined to include the intentional noncompliant flight behavior in the high flight risk level.

In Example 43, the subject matter of Example 42 optionally includes wherein: the corrective action includes a destructive disablement; and the mitigation device generates a radio frequency disablement signal to disable the aerial vehicle.

In Example 44, the subject matter of any one or more of Examples 42-43 optionally include wherein: the corrective action includes a permanent capture; and the mitigation device deploys an aerial vehicle permanent capture countermeasure.

In Example 45, the subject matter of any one or more of Examples 34-44 optionally include wherein the aerial vehicle risk level includes a likelihood probability and a risk severity.

In Example 46, the subject matter of Example 45 optionally includes wherein the likelihood probability is based on a combination of the aerial vehicle location, the detection zone, and a detection zone demographic.

In Example 47, the subject matter of any one or more of Examples 45-46 optionally include wherein the risk severity includes: a trespass minimal risk; a property damage minor risk; a freeway overflight major risk; a crowd overflight hazardous risk; or a commercial airline collision catastrophic risk.

Example 48 is a unmanned aerial vehicle detection and mitigation apparatus comprising: means for detecting an unmanned aerial vehicle within a detection zone; means for generating a detection data set, the detection data set including an aerial vehicle identification and an aerial vehicle location; means for receiving the detection data set from an unmanned aerial vehicle detection sensor; means for determining an unmanned aerial vehicle flight risk level and a compliance classification based on the detection data set; means for determining an unmanned aerial vehicle corrective action based on the flight risk level and the compliance classification; and means for causing an unmanned aerial vehicle mitigation device to execute the corrective action.

In Example 49, the subject matter of Example 48 optionally includes wherein the means for determination of the compliance classification includes means for classifying the detection data set as one of a compliant flight behavior, an unintentional noncompliant flight behavior, or an intentional noncompliant flight behavior.

In Example 50, the subject matter of Example 49 optionally includes wherein the means for determination of the compliance classification based on the detection data set includes an aerial vehicle classification engine stored in the one or more storage devices, the aerial vehicle classification engine previously trained with a labeled input data set for supervised learning, the labeled input data set including a plurality of previously classified unmanned aerial vehicle detection sensor data.

In Example 51, the subject matter of Example 50 optionally includes wherein the means for determination of the compliance classification based on the detection data set includes means for training the aerial vehicle classification engine with an unlabeled input data set for unsupervised learning, the unlabeled input data set including the detection data set from the unmanned aerial vehicle detection sensor.

In Example 52, the subject matter of any one or more of Examples 49-51 optionally include wherein the flight risk level includes at least one of a high flight risk level, a medium flight risk level, and a low flight risk level.

In Example 53, the subject matter of Example 52 optionally includes wherein: the corrective action includes a nondestructive interference; and the mitigation device generates a radio frequency interference signal to interrupt a navigation communication between the aerial vehicle and an aerial vehicle control device.

In Example 54, the subject matter of any one or more of Examples 49-53 optionally include wherein the risk level is determined to include at least one of: the unintentional noncompliant flight behavior in the high flight risk level; and the intentional noncompliant flight behavior in the medium flight risk level.

In Example 55, the subject matter of Example 54 optionally includes wherein: the corrective action includes a nondestructive disablement; and the mitigation device generates a radio frequency disablement signal to disable the aerial vehicle.

In Example 56, the subject matter of any one or more of Examples 54-55 optionally include wherein: the corrective action includes a temporary capture; and the mitigation device deploys an aerial vehicle temporary capture countermeasure.

In Example 57, the subject matter of any one or more of Examples 49-56 optionally include wherein the risk level is determined to include the intentional noncompliant flight behavior in the high flight risk level.

In Example 58, the subject matter of Example 57 optionally includes wherein: the corrective action includes a destructive disablement; and the mitigation device generates a radio frequency disablement signal to disable the aerial vehicle.

In Example 59, the subject matter of any one or more of Examples 57-58 optionally include wherein: the corrective action includes a permanent capture; and the mitigation device deploys an aerial vehicle permanent capture countermeasure.

In Example 60, the subject matter of any one or more of Examples 49-59 optionally include wherein the aerial vehicle risk level includes a likelihood probability and a risk severity.

In Example 61, the subject matter of Example 60 optionally includes wherein the likelihood probability is based on a combination of the aerial vehicle location, the detection zone, and a detection zone demographic.

In Example 62, the subject matter of any one or more of Examples 60-61 optionally include wherein the risk severity includes: a trespass minimal risk; a property damage minor risk; a freeway overflight major risk; a crowd overflight hazardous risk; or a commercial airline collision catastrophic risk.

Example 63 is one or more machine-readable medium including instructions, which when executed by a machine, cause the machine to perform operations of any of the operations of Examples 1-62.

Example 64 is an apparatus comprising means for performing any of the operations of Examples 1-62.

Example 65 is a system to perform the operations of any of the Examples 1-62.

Example 66 is a method to perform the operations of any of the Examples 1-62.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. An unmanned aerial vehicle detection and mitigation system comprising:
   an unmanned aerial vehicle detection sensor to detect an unmanned aerial vehicle within a detection zone and generate a detection data set, the detection data set including an aerial vehicle identification and an aerial vehicle location;
   an unmanned aerial vehicle mitigation device,
   one or more processors;
   one or more storage devices comprising instructions, which when executed by the one or more processors, configure the one or more processors to:
      receive the detection data set from the unmanned aerial vehicle detection sensor;
      determine an unmanned aerial vehicle flight risk level and a compliance classification based on the detection data set;
      determine an unmanned aerial vehicle corrective action based on the flight risk level and the compliance classification; and
      cause the unmanned aerial vehicle mitigation device to execute the corrective action.

2. The system of claim 1, wherein the determination of the compliance classification includes classifying the detection data set as one of a compliant flight behavior, an unintentional noncompliant flight behavior, or an intentional noncompliant flight behavior.

3. The system of claim 2, wherein the determination of the compliance classification based on the detection data set includes an aerial vehicle classification engine stored in the one or more storage devices, the aerial vehicle classification engine previously trained with a labeled input data set for supervised learning, the labeled input data set including a plurality of previously classified unmanned aerial vehicle detection sensor data.

4. The system of claim 3, wherein the determination of the compliance classification based on the detection data set includes training the aerial vehicle classification engine with an unlabeled input data set for unsupervised learning, the unlabeled input data set including the detection data set from the unmanned aerial vehicle detection sensor.

5. The system of claim 2, wherein the flight risk level includes at least one of a high flight risk level, a medium flight risk level, and a low flight risk level.

6. The system of claim 5, wherein:
   the corrective action includes a nondestructive interference; and
   the mitigation device generates a radio frequency interference signal to interrupt a navigation communication between the aerial vehicle and an aerial vehicle control device.

7. The system of claim 2, wherein the risk level is determined to include at least one of:
   the unintentional noncompliant flight behavior in the high flight risk level; and
   the intentional noncompliant flight behavior in the medium flight risk level.

8. The system of claim 7, wherein:
   the corrective action includes a nondestructive disablement; and
   the mitigation device generates a radio frequency disablement signal to disable the aerial vehicle.

9. The system of claim 7, wherein:
   the corrective action includes a temporary capture; and
   the mitigation device deploys an aerial vehicle temporary capture countermeasure.

10. The system of claim 2, wherein the risk level is determined to include the intentional noncompliant flight behavior in the high flight risk level.

11. The system of claim 10, wherein:
    the corrective action includes a destructive disablement; and
    the mitigation device generates a radio frequency disablement signal to disable the aerial vehicle.

12. The system of claim 10, wherein:
    the corrective action includes a permanent capture; and
    the mitigation device deploys an aerial vehicle permanent capture countermeasure.

13. An unmanned aerial vehicle detection and mitigation method comprising:
    detecting an unmanned aerial vehicle within a detection zone;
    generating a detection data set, the detection data set including an aerial vehicle identification and an aerial vehicle location;
    receiving the detection data set from an unmanned aerial vehicle detection sensor;
    determining an unmanned aerial vehicle flight risk level and a compliance classification based on the detection data set;
    determining an unmanned aerial vehicle corrective action based on the flight risk level and the compliance classification; and
    causing an unmanned aerial vehicle mitigation device to execute the corrective action.

14. The method of claim 13, wherein the determination of the compliance classification includes classifying the detection data set as one of a compliant flight behavior, an unintentional noncompliant flight behavior, or an intentional noncompliant flight behavior.

15. The method of claim 14, wherein the determination of the compliance classification based on the detection data set includes an aerial vehicle classification engine stored in the one or more storage devices, the aerial vehicle classification engine previously trained with a labeled input data set for supervised learning, the labeled input data set including a plurality of previously classified unmanned aerial vehicle detection sensor data.

16. The method of claim 15, wherein the determination of the compliance classification based on the detection data set includes training the aerial vehicle classification engine with an unlabeled input data set for unsupervised learning, the unlabeled input data set including the detection data set from the unmanned aerial vehicle detection sensor.

17. At least one machine-readable storage medium, comprising a plurality of instructions that, responsive to being executed with processor circuitry of a computer-controlled device, cause the computer-controlled device to:
    detect an unmanned aerial vehicle within a detection zone;
    generate a detection data set, the detection data set including an aerial vehicle identification and an aerial vehicle location;

receive the detection data set from an unmanned aerial vehicle detection sensor;

determine an unmanned aerial vehicle flight risk level and a compliance classification based on the detection data set;

determine an unmanned aerial vehicle corrective action based on the flight risk level and the compliance classification; and cause an unmanned aerial vehicle mitigation device to execute the corrective action.

18. The machine-readable storage medium of claim 17, wherein the determination of the compliance classification includes classifying the detection data set as one of a compliant flight behavior, an unintentional noncompliant flight behavior, or an intentional noncompliant flight behavior.

19. The machine-readable storage medium of claim 18, wherein the determination of the compliance classification based on the detection data set includes an aerial vehicle classification engine stored in the one or more storage devices, the aerial vehicle classification engine previously trained with a labeled input data set for supervised learning, the labeled input data set including a plurality of previously classified unmanned aerial vehicle detection sensor data.

20. The machine-readable storage medium of claim 19, wherein the determination of the compliance classification based on the detection data set includes training the aerial vehicle classification engine with an unlabeled input data set for unsupervised learning, the unlabeled input data set including the detection data set from the unmanned aerial vehicle detection sensor.

* * * * *